Figure 5:
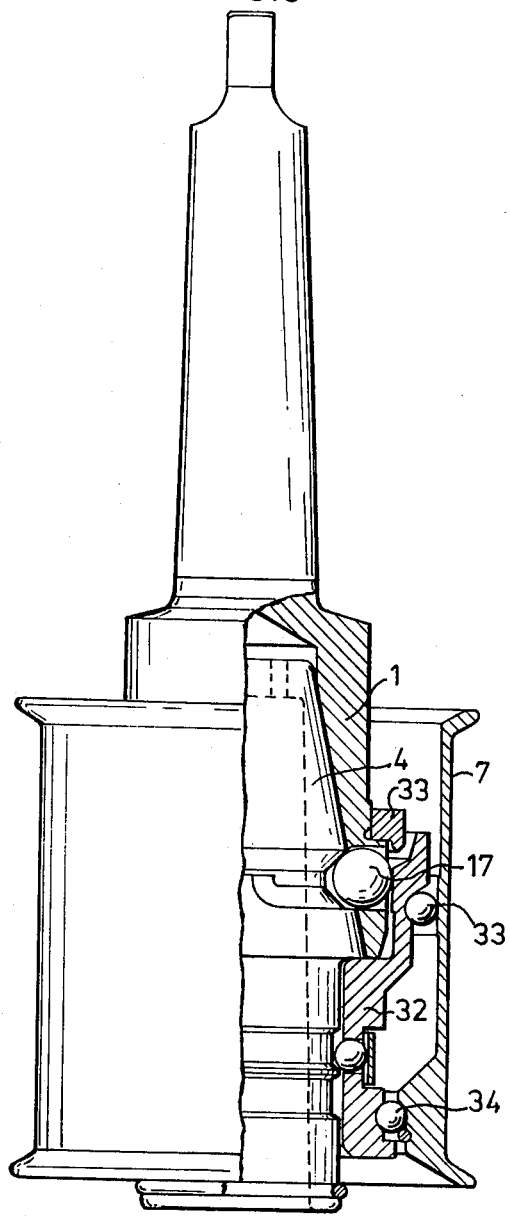

United States Patent [19]

Hultman

[11] 3,947,047

[45] Mar. 30, 1976

[54] QUICK-CHANGE COLLET

[75] Inventor: Ture Oskar Hultman, Boras, Sweden

[73] Assignee: Aktiebolaget Eminentverktyg, Torshalla, Sweden

[22] Filed: May 31, 1974

[21] Appl. No.: 475,109

[30] Foreign Application Priority Data
June 4, 1973  Sweden .................... 73078529

[52] U.S. Cl. ................. 279/1 B; 279/22; 279/75
[51] Int. Cl.² .................................. B23B 31/22
[58] Field of Search ........... 279/76, 1 B, 82, 75, 74, 279/22

[56] References Cited
UNITED STATES PATENTS

| | | | |
|---|---|---|---|
| 2,835,497 | 5/1958 | Suhner | 279/75 Y |
| 3,801,115 | 4/1974 | Benjamin | 279/1 B X |

FOREIGN PATENTS OR APPLICATIONS

| | | | |
|---|---|---|---|
| 949,381 | 9/1956 | Germany | 279/75 |
| 934,860 | 11/1955 | Germany | 279/22 |

Primary Examiner—Travis S. McGehee
Assistant Examiner—W. R. Briggs
Attorney, Agent, or Firm—Finnegan, Henderson, Farabow & Garrett

[57] ABSTRACT

A quick-change collet is disclosed with a tool holding insert, fitted in a collet sleeve and with a locking device releaseable by an outer sleeve for retention and driving the insert in the collet sleeve. The outer sleeve is rotatably journalled on the insert and the bearing is so connected with the insert that the insert accompanies the outer sleeve when this is used as a hand hold to move the insert with tool out from the collet or to place it in the collet.

5 Claims, 3 Drawing Figures

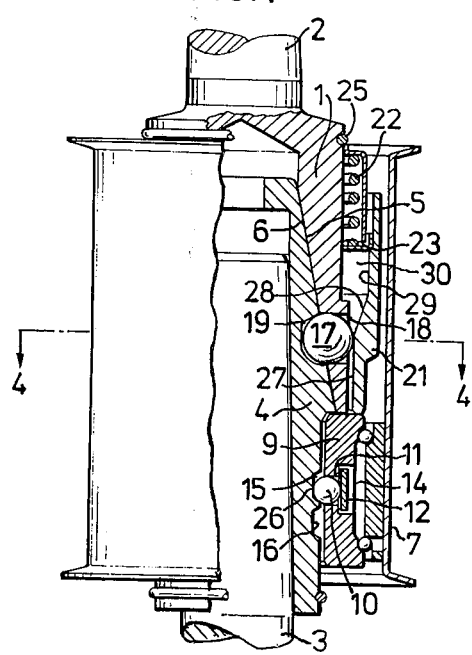
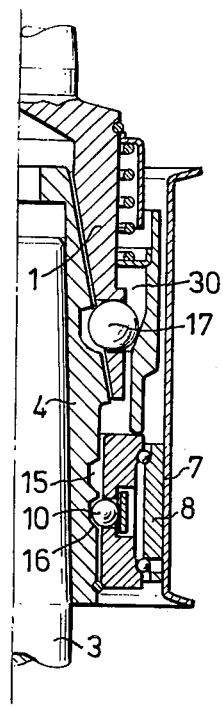
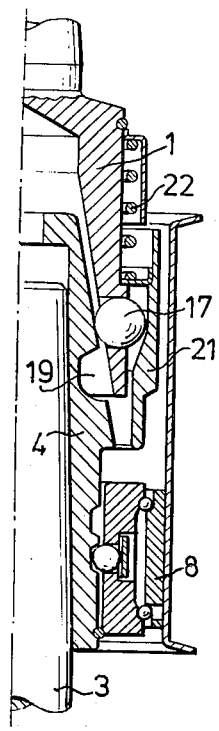
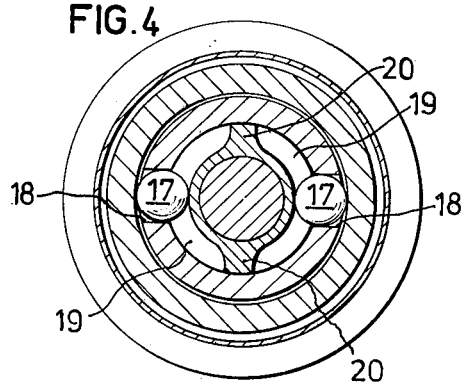

QUICK-CHANGE COLLET

The present invention relates to such quick-change collets which are provided with a tool holding insert fitting a collet sleeve and with a locking means releasable while running for the retention of the insert and for picking up the collet sleeve. In a known design of quick-change collets of this kind, an outer sleeve is displaceable against spring bias on the collet sleeve, and when the locking means is to be released to free the insert the outer sleeve is displaced by hand in a direction away from the tool, or upwards if the tool shank is vertical. This is done with one hand while the other hand pulls the insert with the tool from the collet sleeve. In certain designs the outer sleeve is locked onto the insert by a screwed connection, whereat the outer sleeve must first be turned in relation to the insert before release of the locking means can take place in the way indicated. This is a complicated operation and both hands must be used, whereat injuries can easily be caused, especially if the tool consists of a milling cutter with sharp edges in the region of outer sleeve.

The invention primarily intends to obviate the inconveniencies mentioned and to provide a quick-change collet in which the exchange of tool and insert can take place with a simple hand-maneuver, namely so that there is only the need to use one hand for removing the insert from the collet sleeve and for replacing it therein. The invention is foremostly distinguished by the outer sleeve being rotatably journalled on the insert, the bearing being so united with it that the insert accompanies the outer sleeve when this is used as a handhold to take the insert with its fitted tool out from the collet or to place it in the collet. In this design, if the tool is to be changed, which generally takes place when the spindle on which the chuck is mounted rotates, it is only necessary to take the outer sleeve with one hand and pull it outwards from the collet, whereat the locking device is released and the tool together with the insert come away, whereon a new tool with insert and outer sleeve can be mounted by simply being pushed into the collet sleeve using the outer sleeve. The locking means thereby functions automatically.

In order that the locking device shall be opened and closed automatically by the outer sleeve in the simplest manner, the bearing can be combined with a spring latch, which makes possible limited axial displacement of the outer sleeve in relation to the insert, namely between two end positions, the one corresponding to the driving position of the locking means, i.e. the closed position, and the other corresponding to an intermediate position between this driving position and a free position, i.e. the open position. Since the outer sleeve is rotatably journalled on the insert, it ceases to rotate as soon as it is gripped with the hand, and exchange can be carried out without touching any rotating parts. The bearing can be made in different ways, but it should be a combined axial and radial bearing, suitably one of this kind having a rolling body bearing. It can have an outer bearing ring which is attached in the outer sleeve, and an inner bearing ring which concentrically surrounds the insert. The spring lock can consist of one or more balls or the like mounted in the inner bearing ring, and which by one or more springs are held in engagement with the one or the other of two circumferential grooves on the insert. These two grooves determine both the end positions. The inner bearing ring can form the guiding sleeve for the locking means which are made as a rolling body lock or alternatively coact with a retaining sleeve for this purpose, which is separated from the inner bearing ring.

Further distinguishing features for the invention and advantages united therewith may be seen from the following description of a pair of embodiment examples shown on the accompanying drawings, FIGS. 1–4 show the first embodiment example and FIG. 5 the second one. FIG. 1 shows a vertical projection of a quick-change collet having the right-hand half in an axial section, the insert being completely engaged in the collet sleeve. FIG. 2 shows the same axial section but with the outer sleeve in an intermediate position, and FIG. 3 shows the axial section with the outer sleeve and the insert in a neutral position. FIG. 4 is a radial section along the line 4—4 in FIG. 1. FIG. 5 shows the second embodiment in the same way as in FIG. 1.

In the embodiments shown, the quick-change collet consists of a collet sleeve 1 with a shank 2, intended to be more or less permanently attached or connected to a rotating working spindle. The intention is that the tool 3 which is provided with a tubular shaped insert 4 shall be able to be removed from the collet sleeve and replaced by a new one while the collet sleeve rotates. The insert has a conical surface 5 which fits a corresponding conical recess 6 in collet sleeve 1 in the mounted position. The insert is retained in the inserted position by a locking device which in FIG. 1 is shown in a locked position and in FIG. 3 in a released position. This locking device has two functions, namely to retain the insert axially in the collet sleeve and to drive the insert and tool when the collet sleeve rotates. The locking device is taken to the free position simply by drawing the insert downwards by means of an outer sleeve 7 mounted thereon. The bearing is so designed that it can take the insert with it axially without the outer sleeve rotating. For this purpose the outer sleeve is carried on the insert by means of a bearing which, in the embodiment shown, is a combined axial and radial rolling body bearing with an outer bearing ring 8 attached to the outer sleeve and an inner bearing ring 9 which is connected with the insert by means of a spring lock. The spring lock consists of a number of balls 10 which are displaceably fitted in radial holes 11 in the inner bearing ring 9 and a curved flat spring 12, kept in a slot 14 in said ring, so that it presses the balls 10 inwardly. These balls are thereby pressed in one or the other of two circumferential grooves 15,16 in the outer cylindrical surface of the insert.

The locking device consists of locking rolling bodies 17 which are displaceable in radial holes 18 in the collet sleeve 1, and by recesses 19 in the insert. As may be seen from FIG. 4 the recesses 19 are trough-like and are peripherally limited by projections 20 formed by the wall of the insert. In the embodiment shown in FIGS. 1 and 4 there are two balls and the corresponding grooves 19, but a larger number of locking bodies with a rolling shape or another shape evenly distributed around the circumference can be conceived. The locking rolling bodies 17 are retained in the locking position in engagement with recesses 19 by a surrounding retaining sleeve 21, which at its lower end is kept pressed against the inner bearing ring 9 by a helical spring 22 disposed between an annular supporting plate 23 in the retaining sleeve and by a spring keeper 24 placed on and surrounding collet sleeve 1, where it is maintained in position by a circlit 25. The axial force applied by spring 22 on the retaining sleeve is less than the counter axial force, arising and acting on bearing ring 9 by the balls 10 in the spring lock being pressed by spring 12 against a downwardly sloping edge 26 of the groove 15 in insert 4. The spring lock can therefore retain the retaining sleeve in a locking position against the effect of spring 22. Internally, the retaining sleeve 21 increases in diameter from a lower cylindrical surface 27 via a conical surface 28 to an upper cylindrical surface 29, a space 30 being formed upwardly thereby, between the inner circumference of the retaining sleeve and the outer circumference of collet sleeve 1.

The method of operation for the aforementioned quick change collet is mainly the following:

In the starting position shown in FIG. 1 the chuck is assumed to be rotating. The outer sleeve 7 is gripped with one hand and is drawn downwards, whereat first of all the balls 10 of the spring lock jump from groove 15 to the lower groove 16 on the insert. The balls 17 of the locking device namely lock the insert to the collet sleeve 1 during this first movement. The parts are now assumed to take up the position shown in FIG. 2. Because of the bearing 8, 9 the outer sleeve 7 does not rotate, which however, is the case with the insert 4 and tool 3. If one continues to pull the outer sleeve 7 downwards, the insert 4 is drawn with it via the bearing 8, 9 since the inner bearing ring cannot be displaced further down on the insert. The retaining sleeve 21 is pressed downwards by the spring 22 so that the locking balls 17 are opposite the upper cylindrical surface 29 on the retaining sleeve 29. They can therefore be taken outwardly by centrifugal force so that they partly assume a position in space 30 first being removed from recesses 19. The insert is now free and can be taken out from the collet sleeve 1 by means of the outer sleeve. When inserting a new tool with the insert and outer sleeve mounted, the reverse procedure is adopted and in the final part of it, the retaining sleeve 21 is pressed upwards by the inner bearing ring 9 to the position shown in FIG. 1, where the balls 10 of the spring lock have jumped over from groove 16 to groove 15 so that the retaining sleeve assumes its closed position.

The embodiment shown in FIG. 5 differs mainly from the one described by the inner bearing ring 9 having been made in one piece with the retaining sleeve 21 to form a sleeve 32, which is carried in the outer sleeve 7 by means of two ball races 33 and 34. The helical spring 22 is lacking and the rolling bodies 17 of the locking device are prevented by an upper stop ring 34 from falling out when the sleeve 32 is drawn downwards by means of the outer sleeve. The method of operation for this embodiment should be self-evident after the description of the method of operation for the first embodiment.

What I claim is:

1. A quick change collet for detachably connecting a tool holding insert comprising: a collet sleeve disposed to internally receive said tool holding insert; locking means engaging both said collet sleeve and said insert, said locking means comprising a plurality of first ball-like members selectively passed through said collet sleeve to engage said insert; retaining sleeve means surrounding said collet sleeve for controlling the position of said first ball-like members within said collet sleeve; a spring lock having an inner bearing ring retaining a plurality of second ball-like members, with said second ball-like members contacting a spring, said spring forcing said second ball-like members into contact with said insert where there are provided on said insert at least two axially spaced circumferential grooves disposed to receive said second ball-like members, said circumferential grooves allowing complete rotation of said insert in relation to said inner bearing ring; an outer sleeve surrounding said bearing ring attached only to said bearing ring through a bearing allowing rotation of said bearing ring within said outer sleeve while providing means for applying axial force to said inner bearing member, said axial force applied to said bearing ring moving said bearing ring axially thereby moving said retaining sleeve.

2. The quick change collet of claim 1 where said spring lock comprises a plurality of balls retained in a circumferential groove in said inner bearing ring, said balls being maintained in engagement with said circumferential grooves on said insert by at least one spring within said inner bearing ring.

3. The quick change collet of claim 2 where said inner bearing ring comprises a portion of said retaining sleeve means.

4. The quick change collet of claim 1 where said inner bearing ring comprises a portion of said retaining sleeve means.

5. The quick change collet of claim 2 where said retaining sleeve is separate from said inner bearing ring and said retaining sleeve is axially displaced by a helical spring between said retaining sleeve and said collet sleeve.

* * * * *